Oct. 4, 1932.     J. SQUIRES     1,880,995

AIRPLANE PROPELLER

Filed Nov. 17, 1928

INVENTOR
JOHN SQUIRES.
BY Harness, Dickey & Pierce
ATTORNEY

Patented Oct. 4, 1932

1,880,995

UNITED STATES PATENT OFFICE

JOHN SQUIRES, OF DETROIT, MICHIGAN

AIRPLANE PROPELLER

Application filed November 17, 1928. Serial No. 320,011.

My invention relates to propellers which are particularly adapted for use on heavier than aircraft. One of the primary objects of my invention is to provide struts or stiffening members for the blades of the propeller which will strengthen the same. Another object is to provide such stiffening struts with sheathings or the like so shaped as to become a portion of the working surfaces of the propeller.

Another object is to provide a propeller of peculiar construction which is adapted to withstand heavy uses, which will give the greatest possible efficiency and which will be simple and easy to construct.

With the above and other objects in view my invention consists in the arrangement, combination and construction of the various parts of my improved device as described in the specification, claimed in my claims and shown in the accompanying drawing, in which:

Figure 3:
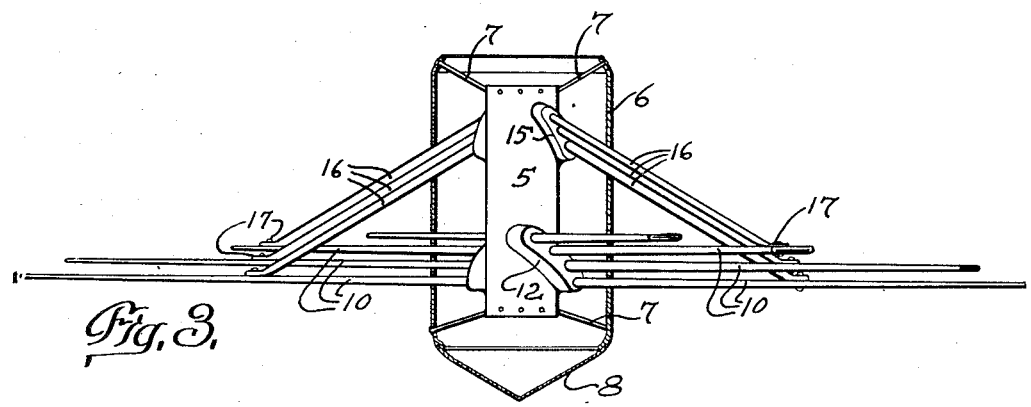
Fig. 3 is a plan view of the skeleton construction used in the fabricating of my improved propeller, the central housing portion being shown in section.
Figure 2:
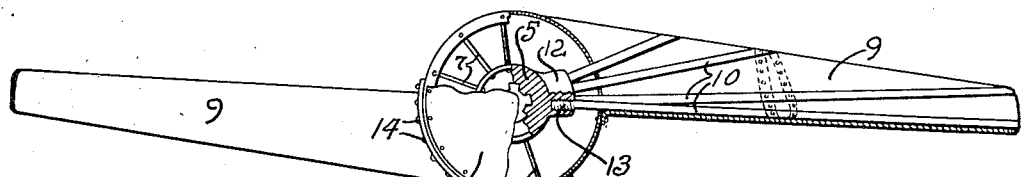
Fig. 2 is a front elevation of the same with certain parts broken away to illustrate the interior construction thereof.
Figure 1:
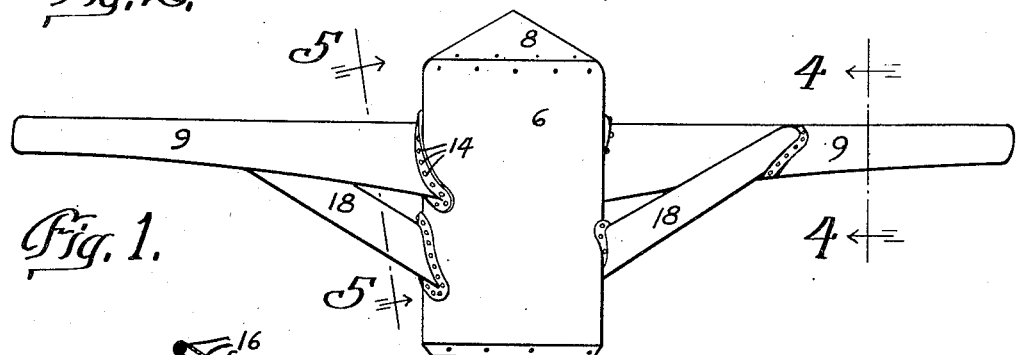
Fig. 1 is a plan view of a propeller embodying my invention.
Figure 5:
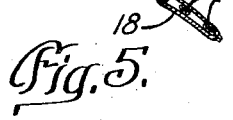
Fig. 5 is a view taken on line 5—5 of Fig. 1.
Figure 6:
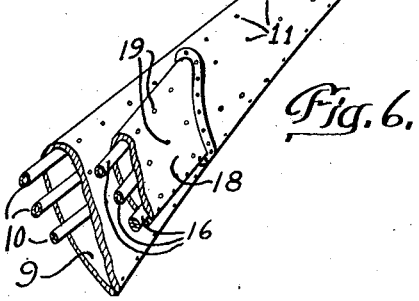
Fig. 6 is a prospective view of a propeller blade and its attached bracing strut disassembled from the hub.
Figure 4:
Fig. 4 is a view taken on line 4—4 of Fig. 1.

I have shown a propeller comprising a central hub member 5, which may be connected in any suitable manner with a drive shaft or other driving means. The central housing member 6 is secured to the hub 5 by a plurality of spokes 7. The front end of the member 6 is provided with a pointed nose 8, having a projectile shoulder, which is adapted to engage the air and deflect the same outwardly and rearwardly toward the ends of the blades 9.

The blades 9 are formed of a plurality of pipes or tubular members 10, which give great strength to the same, and suitable sheathing for forming the working surfaces thereof. The sheathing may be of any suitable material. I have shown it to be of metal secured to the pipes 10 by rivets 11.

Before the sheathing is applied to the pipes or tubular members 10 they are assembled to the hub 5. One method of securing the same to the hub is by providing bosses 12 on the hub, in which are provided screw threaded apertures. The ends of members 10 may be threaded as at 13 and screwed into the threaded apertures in the bosses 12. The apertures may be suitably arranged so as to give an airfoil or other desired form to the blades when the sheathing is applied. The sheathing may be secured at the point where it joins the housing 6 by means of a plurality of rivets 14.

In order to suitably place the main blades of the propeller which have just been described, I may provide additional bosses 15 on the hub 5 in which pipes or tubular members 16 similar to the members 10 may be secured. The outer ends of the pipes or tubular members 16 may be riveted, as at 17, to the members 10 or otherwise suitably secured to the main blades. The members 16 may be suitably encased or sheathed to form additional blades 18 adapted to assist in performing the work which the propeller is adapted or intended to perform. This sheathing may be secured to the member 16 by rivets 19 or any other suitable means.

While it will be readily seen that the various objects of my invention are fulfilled in this embodiment, it will be readily understood that this is only one embodiment thereof and that various changes may be made in the arrangement, combination and construction of the various parts of my improved device without departing from the spirit of my invention, and it is my intention to cover by my claims such changes as may reasonably be included within the scope of my invention.

What I claim is:

1. A propeller comprising a hub having blades radiating therefrom and bracing struts for said blades, said struts comprising tubular pieces, encased in a pitched sheathing to form working surfaces.

2. A propeller comprising a hub having blades radiating therefrom and bracing struts for said blades, said struts each comprising a plurality of tubular pieces secured at one end to the hub and sheathed to form propelling surfaces.

3. A propeller comprising a hub portion, a plurality of tubular members extending from the hub portion forming portions of the propeller blades, sheathings for the members constituting the working surfaces of the blades, a plurality of other tubular members extending between the hub and said first blades, acting as struts for the first blades, and sheathing for said last mentioned tubular members pitched to constitute additional working surfaces for the propeller.

4. A propeller comprising a hub portion, a plurality of tubular members extending from the hub portion forming portions of the propeller blades, sheathings for the members constituting the working surfaces of the blades, a plurality of other tubular members extending between the hub and said first blades acting as struts for the first blades, and sheathings for said other members pitched in accordance with the pitch of the corresponding blades.

5. A propeller comprising an extended tubular hub, blades radiating from a portion of said hub and struts extending from another portion of the hub to the blades for bracing them, said struts comprising a plurality of brace members encased in sheathing, said sheathing being pitched to form propelling surfaces.

6. A propeller comprising a hub having blades radiating therefrom, and substantially straight hollow bracing struts connecting each of said blades between its root and its tip with said hub at a point materially spaced axially of said propeller from said blades, said struts being of airfoil section and pitched in accordance with the corresponding blades whereby to impart added propelling surfaces to said propeller.

7. A propeller comprising a hub and blades radiating therefrom, a group of brace members connecting each of said blades with said hub at a point on said hub space from the point of connection of said blades and said hub, the members of said groups being off-set from each other axially and radially of said hub whereby to conform generally to the pitch of the corresponding blade, and a sheathing of airfoil section for each of said groups conforming in pitch to the pitch of said group.

8. A propeller structure comprising a plurality of sets of radiating tubular rods secured to an airplane propeller in radiating relation with respect to each other, certain of the rods being shorter than the others, and outwardly tapered shell providing airfoil covering for each set of rods secured thereupon.

9. A propeller structure for aircraft comprising a hub, a plurality of groups of tubular rods radiating from the hub and forming a framework for hollow propeller blades and hollow bracing rods secured at their inner ends to the hub at points spaced from the points of attachment of the first mentioned rods and being secured at their outer extremities directly to the radiating rods, outwardly tapered airfoil sheathing enclosing the radiating rods and an additional outwardly tapered airfoil sheathing enclosing the bracing rods and being connected to the first mentioned sheathing.

JOHN SQUIRES.